(12) United States Patent
Huang et al.

(10) Patent No.: US 7,764,878 B2
(45) Date of Patent: Jul. 27, 2010

(54) AUTO-FOCUSING CAMERA

(75) Inventors: Ching-Hsing Huang, Taipei Hsien (TW); Cheng-Fa Weng, Taipei Hsien (TW); Jen-Te Wang, Taipei Hsien (TW); Jen-Hung Chung, Taipei Hsien (TW); Chou-Chen Shih, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 244 days.

(21) Appl. No.: 11/964,571

(22) Filed: Dec. 26, 2007

(65) Prior Publication Data

US 2008/0310831 A1 Dec. 18, 2008

(30) Foreign Application Priority Data

Jun. 13, 2007 (CN) .................... 2007 1 0075030

(51) Int. Cl.
*G03B 3/00* (2006.01)
*G03B 13/34* (2006.01)
(52) U.S. Cl. ...................... 396/133; 359/824
(58) Field of Classification Search ............ 359/824; 396/85, 133
See application file for complete search history.

(56) References Cited

U.S. PATENT DOCUMENTS 7,039,309 B2    5/2006  Hsiao

| 2004/0207745 | A1* | 10/2004 | Tsuruta et al. | 348/335 |
|---|---|---|---|---|
| 2006/0098969 | A1* | 5/2006 | Asai et al. | 396/89 |
| 2006/0245747 | A1* | 11/2006 | Tiao et al. | 396/85 |
| 2006/0280492 | A1* | 12/2006 | Chang et al. | 396/133 |
| 2007/0154198 | A1* | 7/2007 | Oh et al. | 396/85 |
| 2007/0223903 | A1* | 9/2007 | Ho et al. | 396/85 |
| 2008/0118240 | A1* | 5/2008 | Hong et al. | 396/133 |
| 2008/0225403 | A1* | 9/2008 | Weekamp et al. | 359/666 |

FOREIGN PATENT DOCUMENTS

| CN | 1773821 A | 5/2006 |
|---|---|---|
| CN | 1967307 A | 5/2007 |

\* cited by examiner

*Primary Examiner*—Melissa J Koval
*Assistant Examiner*—Leon W Rhodes
(74) *Attorney, Agent, or Firm*—Jeffrey T. Knapp

(57) ABSTRACT

An auto-focusing camera includes a pair of drive units (100, 200) arranged back-to-back. Each one of the drive units includes a lens unit (11), a permanent magnet (12) mounted around the lens unit, upper and lower coil seats (15a, 15b) arranged at upper and lower sides of the permanent magnet, and upper and lower coils (14a, 14b) wound around the upper and lower coil seats, respectively. The upper and lower coils are used for inducing the upper and lower yokes (10c, 10d) to generate magnetic fields when electric currents are applied to the first and second coils. The magnetic fields generated by the upper and lower yokes interact with the magnetic field of the permanent magnet to drive the lens unit into movement between its focal points. The permanent magnet is fixed to and telescopes inwardly or outwardly with the lens unit.

14 Claims, 7 Drawing Sheets

AUTO-FOCUSING CAMERA

BACKGROUND OF THE INVENTION

1. Field of the Invention

The present invention relates generally to a lens drive mechanism of a camera, and more particularly to a lens drive mechanism of an auto-focusing camera.

2. Description of Related Art

Usually we need a camera to record the memorable moments. The designs of cameras have evolved toward lightweight and compactness, so have the currently popular digital cameras. Conventionally, an auto focus structure is used for controlling the telescopic movement of a lens of the camera.

The auto focus structure of the camera focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by an annular cam. The annular cam is provided with a lens driving structure and driven to rotate by a stepping motor. At the moment when the CPU detects the clearest image as the lens moves back and forth, a stop signal is simultaneously sent to the lens. Therefore, the lens stops at the best focal position (static position). When the lens is to be moved back to the original position, the annular cam starts to rotate again. Once the lens moves back to its original position, the photo interrupter installed by the lens cylinder uses the shutter at the border of the lens cylinder to detect the original position of the lens. The shutter will interrupt the light of the penetration-type photo interrupter. The lens stops at the moment when the photo interrupter detects the original position.

Consequently, the lens in a digital camera auto focus system has to be driven continuously, so is the image detection. Every time an image is captured, the lens has to return to its original position. This method of searching for an optimal focal point makes use of mechanical and continuous lens motion to repeatedly check the image. Thus, the lens focusing procedure is very time-consuming, which, in most of cases, results in losing the best image-capturing time.

SUMMARY OF THE INVENTION

According to a preferred embodiment of the present invention, an auto-focusing camera includes a pair of drive units arranged together. Each one of the drive units includes a lens unit, a permanent magnet mounted around the lens unit, upper and lower coil seats arranged at upper and lower sides of the permanent magnet, and upper and lower coils wound around the upper and lower coil seats, respectively. The upper and lower coils are used for inducing upper and lower yokes mounted to the upper and lower coil seats to generate magnetic fields when electric currents are applied to the upper and lower coils. The magnetic fields generated by the upper and lower yokes interact with the magnetic field of the permanent magnet to drive the lens unit into movement between its focal points. The permanent magnet is fixed to and telescopes inwardly or outwardly with the lens unit.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
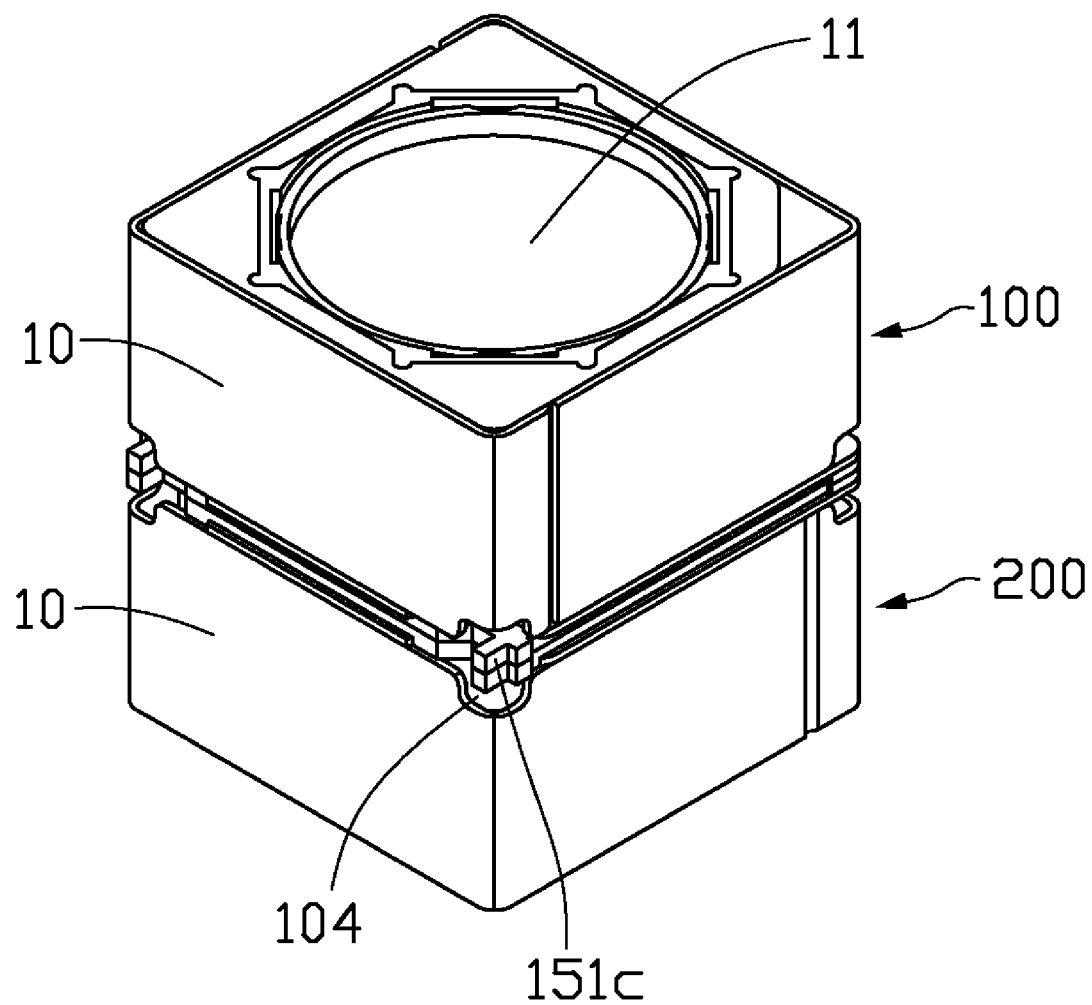
FIG. 1 is an isometric, assembled view of an auto-focusing camera in accordance with a preferred embodiment of the present invention.

Referring to FIG. 1, an auto-focusing camera according to a preferred embodiment includes a pair of drive units (i.e., upper drive unit 100 and lower drive unit 200) being arranged back-to-back and connected together. The two lens drive units 100, 200 are identical to each other, excepting lens 112a, 112b thereof. The lens 112a of the first drive unit 100 is a concave lens, and the lens 112b of the second drive unit 200 is a convex lens.

Figure 2:
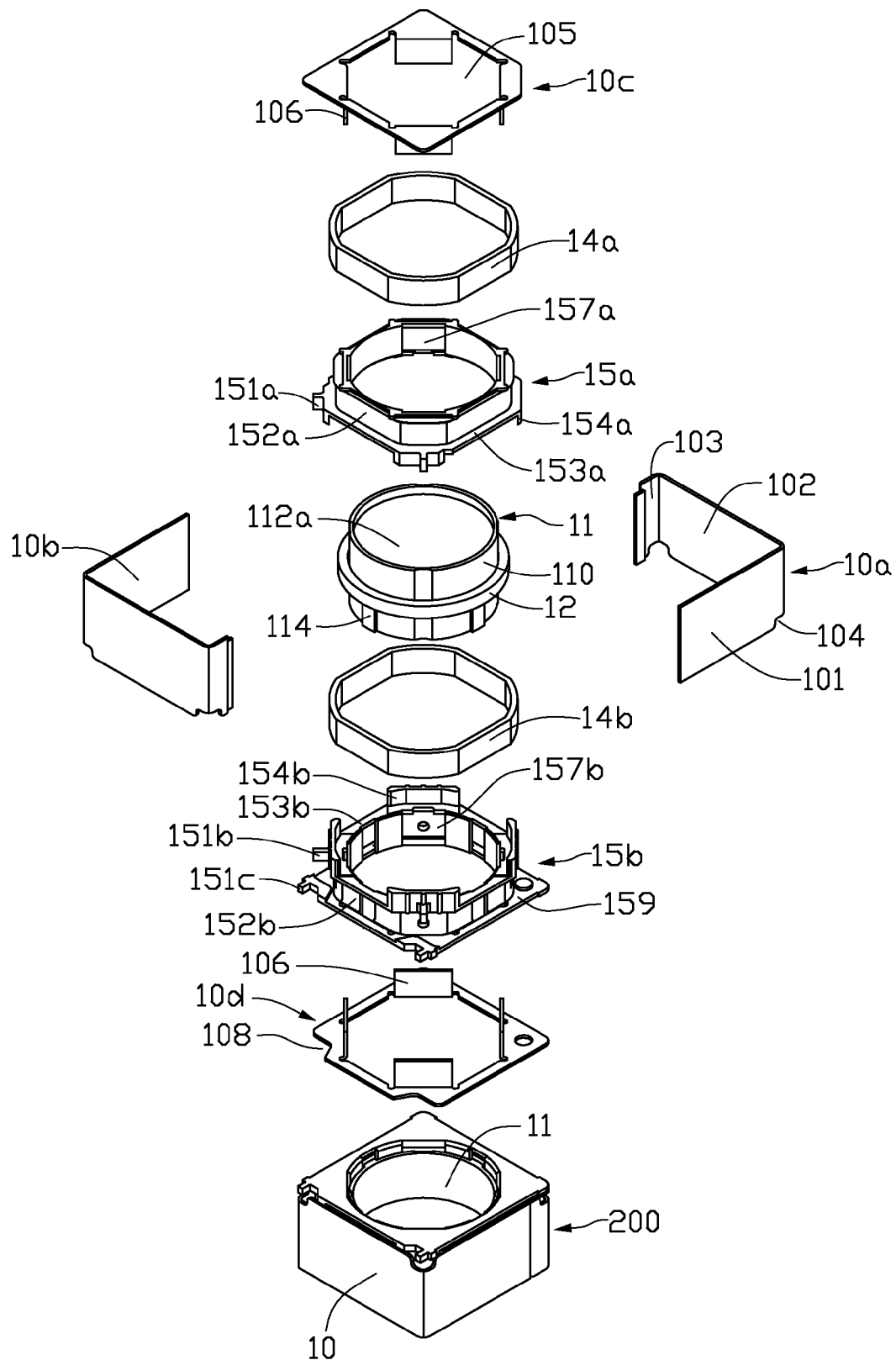
FIG. 2 shows the auto-focusing camera with an upper drive unit being exploded and a lower drive unit being assembled.
Figure 3:
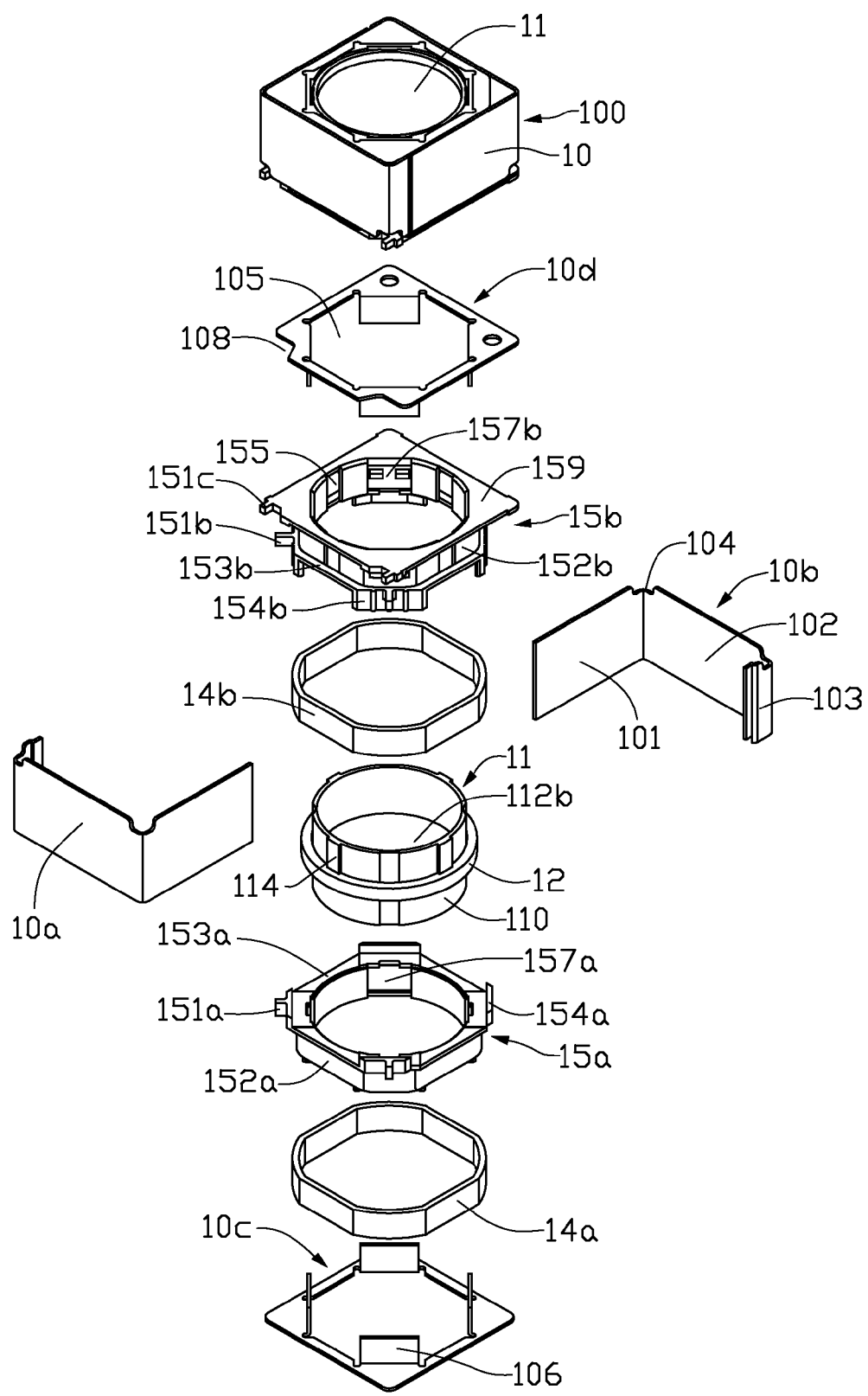
FIG. 3 is similar to FIG. 2, but shows the upper drive unit being assembled and the lower drive unit being exploded.

FIGS. 2 and 3 respectively show an exploded view of the first and second drive units 100, 200. Each drive unit 100, 200 includes a lens mount 10, a lens unit 11 received in the lens mount 10, and a motor (not labeled) mounted around the lens unit 11. During operation of the drive units 100, 200, the motors drive the lens units 11 into telescopic movement between their focal points. Each lens mount 10 is a hollow regular prism with top and bottom ends thereof being open; a space (not labeled) is thus defined in the lens mount 10, which receives the lens unit 11 and the motor therein. A cutout 104 is defined in each of the four corners of a bottom end of the lens mount 10. The lens mount 10 is constructed by fixedly connecting two L-shaped parts 10a, 10b together. Each part 10a, 10b includes first and second plates 101, 102 perpendicular to each other, and a narrow lateral 103 extending perpendicularly from the second plate 102, opposite the first plate 101. The lateral 103 of each part 10a, 10b overlaps the first plate 101 of the other part 10b, 10a, and is fixedly connected therewith by laser welding. Alternatively, the two parts 10a, 10b of the lens mount 10 can lock with each other to assemble together; for example, one of the two parts 10a, 10b defines an aperture therein, and the other part 10b, 10a form a protrusion engaging into the aperture. Also locking devices, such as screws or rivets can be used to lock the two parts 10a, 10b together to form the lens mount 10.

Each lens unit 11 is approximately disc-shaped and has an outer diameter smaller than an inner diameter of the lens mount 10. The lens unit 11 includes a cylindrical-shaped lens barrel 110, and the lens 112a, 112b is fixedly mounted in the lens barrel 110. Four nubs 114 are formed on an outer surface of a lower portion of the lens barrel 110. The nubs 114 are evenly spaced from each other. The lens unit 11 is received in the lens mount 10, and an annular interspace is defined therebetween for receiving the motor.

The motor includes a permanent magnet 12 fixedly mounted around a middle of the lens barrel 110, upper and lower yokes 10c, 10d being arranged at upper and lower sides of the magnet 12, respectively, and upper and lower coils 14a, 14b winding around the upper and lower yokes 10c, 10d, respectively. The yokes 10c, 10d are made of material such as silicone steel, which can be easily magnetized when a magnetic field is applied thereto. Each yoke 10c, 10d is square-shaped and define an octagon-shaped opening 105 therein. Four claws 106 extend perpendicularly and inwardly from four spaced sides of an inner periphery of each yoke 10c, 10d. A pair of notches 108 are respectively defined in two neighboring corners of an outer periphery of the lower yoke 10d.

The coil seats 15a, 15b are approximately identical to each other. Each of the coil seats 15a, 15b includes a cylinder 152a, 152b and a flange 153a, 153b extending radially and outwardly from an inner side of the cylinder 152a, 152b. The flanges 153a, 153b are located near the permanent magnet 12. The flanges 153a, 153b are octagon-shaped, and four blocks 154a, 154b extends perpendicularly from four spaced sides of an outer periphery of each flange 153a, 153b toward the other flange 153b, 153a. A pair of guiding pins 151a, 151b extends outwardly from two neighboring blocks 154a, 154b of each coil seat 15a, 15b. Four grooves 157a, 157b are defined in an inner surface of each cylinder 152a, 152b. The grooves 157a, 157b are evenly spaced from each other. Each groove 157a, 157b is in line with a corresponding block 154a, 154b. The difference between the upper and lower coil seats 15a, 15b is that the lower coil seat 15b further defines four canals 155 in the inner surface of the lower cylinder 152b thereof. The canals 155 are defined for receiving the nubs 114 of the lens barrel 110 therein. The canals 155 and the lower grooves 157b are alternatively arranged along a circumferential direction of the lower cylinder 152b of the lower coil seat 15b. A square-shaped base 159 extends from a bottom of the lower cylinder 152b at an outer side thereof. The base 159 is located distant from the permanent magnet 12. A size of the base 159 is approximately the same as an inner size of the lens mount 10. A pair of connecting pins 151c are formed at two neighboring corners of the base 159 corresponding to the guiding pins 151a, 151b.

The upper and lower coils 14a, 14b are respectively wound around the cylinders 152a, 152b of the upper and lower coil seats 15a, 15b in opposite directions. When electric currents are applied to the coils 14a, 14b, induced magnetic fields established by the two coils 14a, 14b have polarities opposite to each other. The lower coil seat 15b is arranged on the lower yoke 10d. The base 159 attaches to a top surface of the lower yoke 10d and the connecting pins 151c of the base 159 are located just over the notches 108 of the lower yoke 10d, respectively. The claws 106 of the lower yoke 10d are received in the corresponding grooves 157b of the lower coil seat 15b. The lower coil 14b winds around the cylinder 152b of the lower coil seat 15b with the ends thereof winding on the guiding pins 151b of the lower coil seat 15b. Similar to the lower yoke 10d, the claws 106 of the upper yoke 10c are received in the grooves 157a of the upper coil seat 15a, and the upper coil 14a winds on the cylinder 152a of the upper coil seat 15a with the ends thereof winding on the guiding pins 151a of the upper coil seat 15a.

When assembled, the magnet 12 is fixedly adhered to the middle of the lens barrel 110 to move with the lens unit 11. The lens unit 11 with the magnet 12 is then movably received in the space of the lens mount 10. The upper coil seat 15a with the upper yoke 10c and the upper coil 14a, and the lower coil seat 15b with the lower yoke 10d and the lower coil 14b are received in the interspace between the lens mount 10 and the lens unit 11. The upper and lower coil seats 15a, 15b are respectively arranged around the lens unit 11 at upper and lower sides of the permanent magnet 12. The nubs 114 of the lens barrel 110 engage into the canals 155 of the lower coil seat 15b to prohibit rotation of the lens unit 11. Each upper block 154a overlaps and abuts against a corresponding lower block 154b. In this embodiment, the upper blocks 154a are located outside of the lower blocks 154b. The lower blocks 154b are located inside of the upper blocks 154a and are tangential to the barrel 110 of the lens unit 11. Thus, movement of the lens unit 11 is limited by the lower block 154b, and thus swing of the lens unit 11 is avoided. Alternatively, the lower blocks 154b can be located on the outside of the upper blocks 154a, and thus the upper block 154a abuts the lens unit 11 to avoid swing of the lens unit 11. The two corners of the coil seats 15a, 15b having the guiding pins 151a, 151b are located corresponding to each other. The ends of the two coils 14a, 14b winding on the guiding pins 151a, 151b are connected to the connecting pins 151c of the base 159. The lens mount 10 surrounds the motor and the lens unit 11, and the connecting pins 151c are exposed to surrounding environment via the cutouts 104 of the lens mount 10 for convenience of connecting a power source to the coils 14a, 14b. Thus each drive unit 100, 200 is assembled. Then the two drive units 100, 200 are arranged back-to-back with the bases 159 thereof attached and secured to each other. The connecting pins 151c of the two drive units 100, 200 are arranged adjacent to each other. During operation, currents are applied to the coils 14a, 14b of each drive unit 100, 200 through the connecting pins 151c.

FIGS. 4-7 show the situations of the lens units 11 of the auto-focusing camera at different focal points. Each drive unit 100, 200 has a rear focal point and a front focal point. In this embodiment, the upper side of the magnet 12 of the upper drive unit 100 is N (North Pole), and the lower side of the magnet 12 of the upper drive unit 100 is S (South Pole). Reversely, the upper side of the magnet 12 of the lower drive unit 200 is S, and the lower side of the magnet 12 of the lower drive unit 200 is N.

Figure 4:
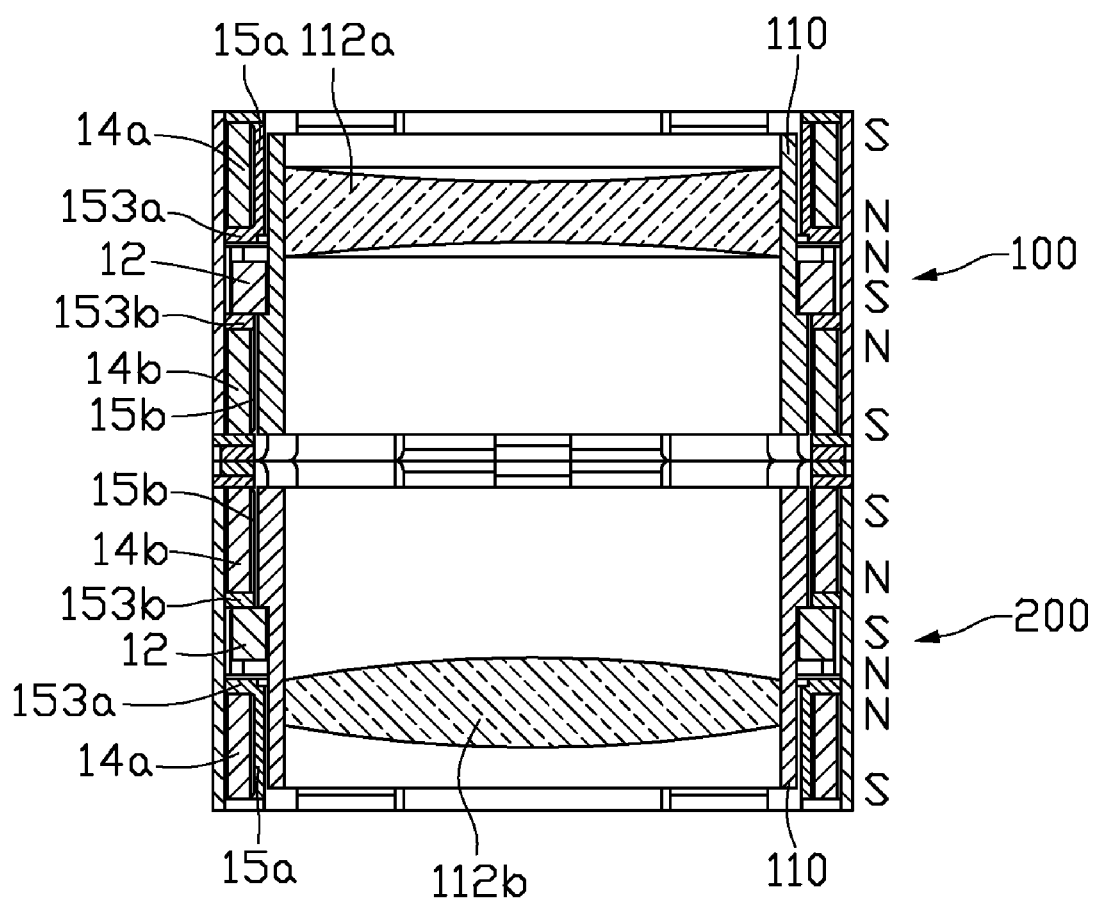
FIGS. 4-7 show cross-sectional views of the auto-focusing camera with the lens units at different focal points thereof.
Figure 5:
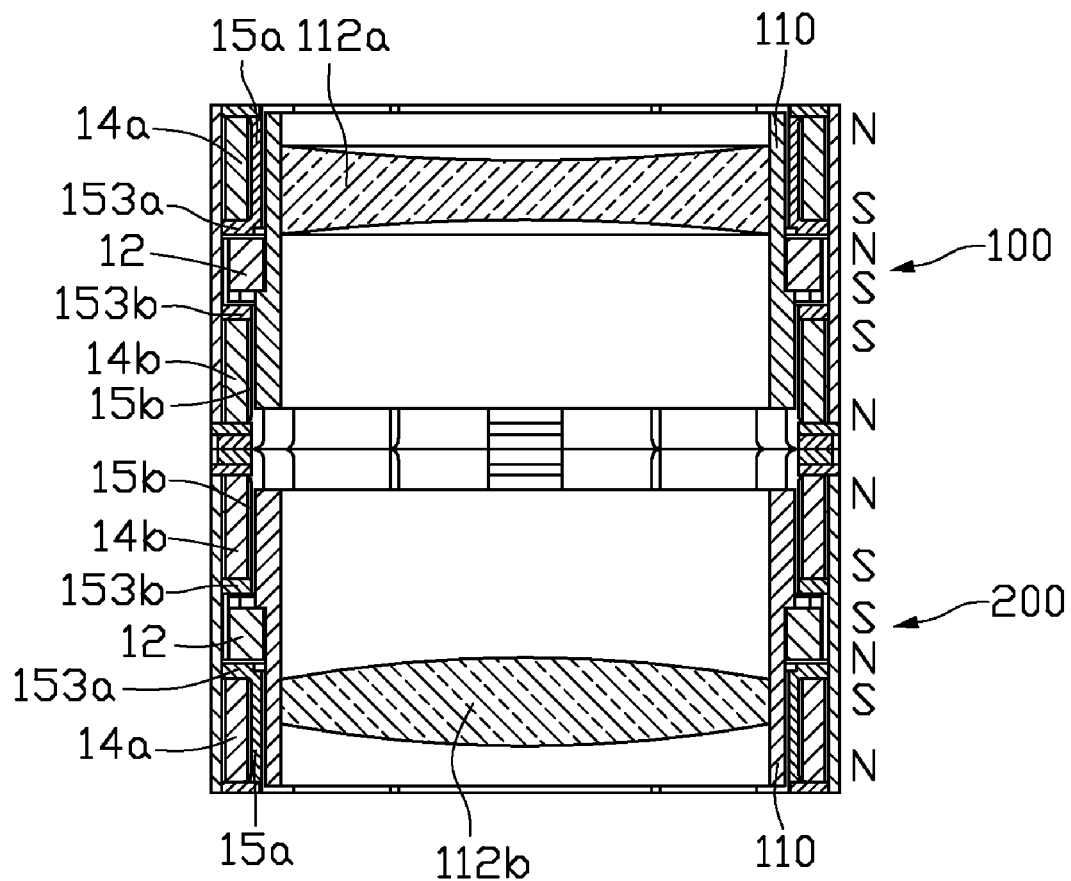

Firstly, as shown in FIG. 4, the upper lens unit 11 is at its rear focal point, and the lower lens unit 11 is at its front rear point. Both the upper lens unit 11 and the lower lens unit 11 are kept static at these positions (original positions), respectively. In this situation, a top end of the upper yoke 10c of the upper drive unit 100 is S, whilst a bottom end of the upper yoke 10c near the magnet 12 is N. Reversely, a bottom end of the lower yoke 10d is S, whilst a top end of the lower yoke 10d near the magnet 12 is N. Thus a repelling force is generated between the upper yoke 10c and the magnet 12, whilst an attractive force is generated between the lower yoke 10d and the magnet 12, whereby the upper lens unit 11 is held at this original position. Likewise, a top end of the upper yoke 10c of the lower drive unit 200 is S, whilst a bottom end of the upper yoke 10c near the magnet 12 of the lower drive unit 200 is N. Furthermore, a bottom end of the lower yoke 10d of the lower drive unit 11 is S, whilst a top end of the lower yoke 10d near the magnet 12 of the lower drive unit 11 is N. Thus, a repelling force is generated between the lower yoke 10d and the magnet 12 of the lower drive unit 200, whilst an attractive force is generated between the upper yoke 10c and the magnet 12 thereof, whereby the lower lens unit 11 is held at this original position. To move the lens units 11 of the upper and lower drive units 100, 200 to move upwardly and downwardly to their front and rear focal points, respectively, currents are applied to the upper and lower coils 14a, 14b to change the polarities of the upper and lower yokes 10c, 10d in a manner as shown by FIG. 5. When the lens unit 11 of the upper drive unit 100 reaches the front focal point, the electric currents supplied to the upper and lower coils 14a, 14b of the upper drive unit 100 are switched off. The yokes 10c, 10d have residual magnetic forces to interact with the magnetic force of the permanent magnet 12 thereby holding the lens unit 11 of the upper drive unit 100 at the front focal point. Likewise, the lens unit 11 of the lower drive unit 200 can also be held at the rear focal point even if the currents supplied to the upper and lower coils 14a, 14b of the lower drive unit 200 are switched off.

Figure 6:
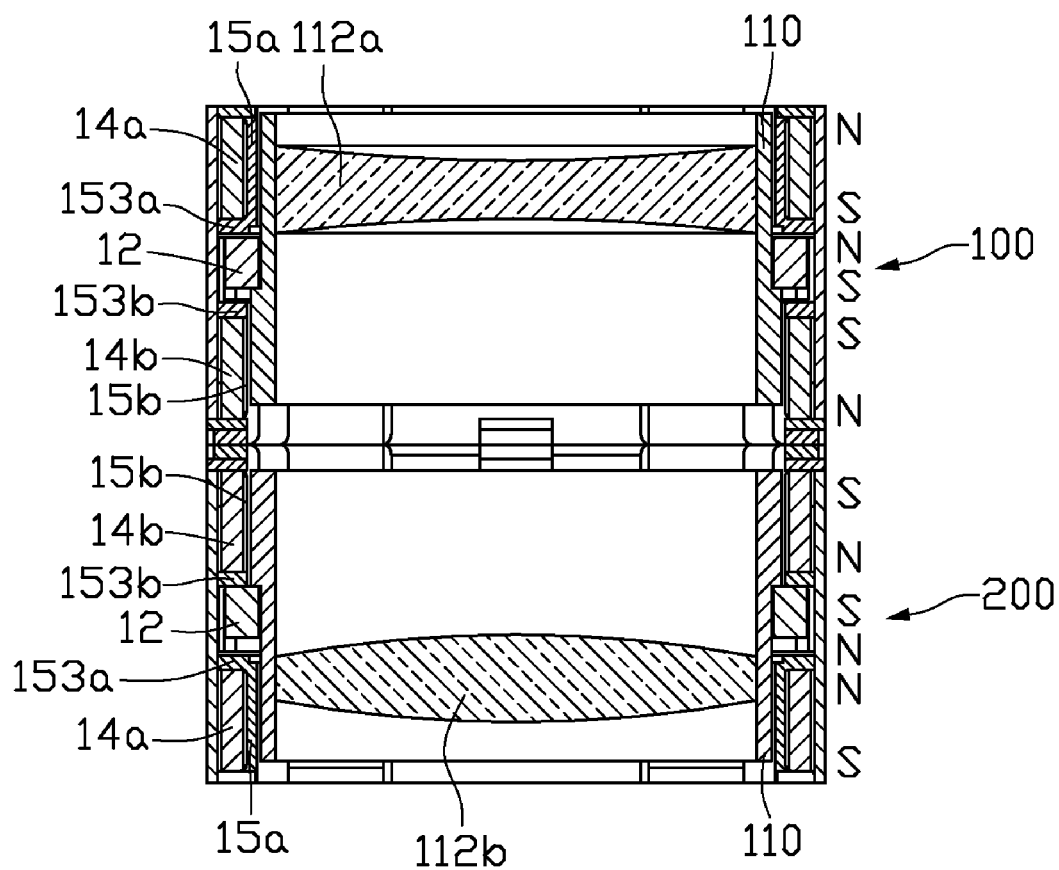
Figure 7:
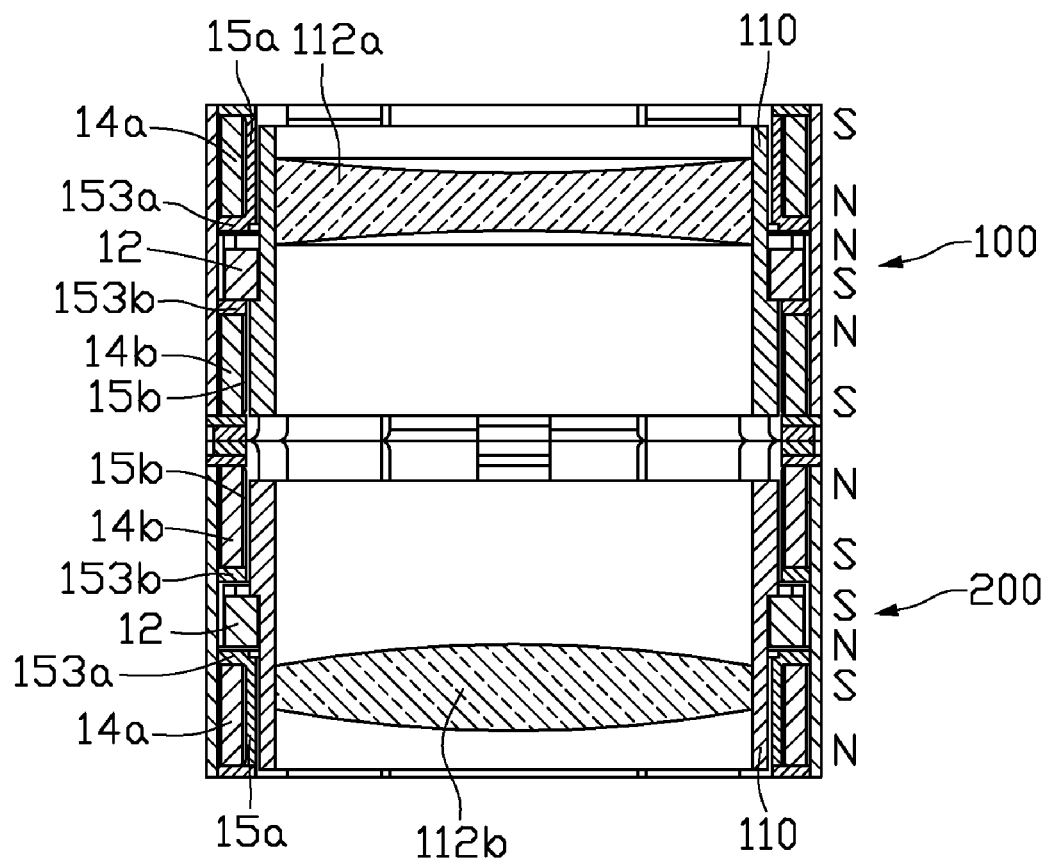

As shown in FIG. 6, the lens unit 11 of the lower drive unit 200 is moved back to the front focal point from FIG. 5, while the lens unit 11 of the upper drive unit 100 is kept at the front focal point. FIG. 7 shows that the lens unit 11 of the upper drive unit 100 is moved back to the rear focal point from FIG. 5, while the lens unit 11 of the lower drive unit 200 is kept at the rear focal point.

In FIG. 6, directions of the electric currents applied to the coils 14a, 14b of the lower drive unit 200 are changed to different directions. The induced magnetic field of the lower coil 14b of the lower drive unit 200 has polarities opposite to that of the magnet 12 of the lower drive unit 200. The top end of the lower yoke 10d of the lower drive unit 200 is N, whilst the bottom end of the lower yoke 10d of the lower drive unit 200 is S. Reversely, the induced magnetic field of the upper coil 14b of the lower drive unit 200 has polarities the same as that of the magnet 12. The bottom end of the upper yoke 10c of the lower drive unit 200 is N, whilst the top end of the upper yoke 10c of the lower drive unit 200 is S. Attractive force is generated between the upper yoke 10c of the lower drive unit 200 and the magnet 12, and repelling force is generated between the lower yoke 10d of the lower drive unit 200 and the magnet 12. The lens unit 11 with the magnet 12 moves upwardly to its front focal point (original position) from a top end of the lower coil seat 15b of the lower drive unit 200 to a bottom end of the upper coil seat 15a of the lower drive unit 200 as shown in FIG. 6, by the attractive force of the upper yoke 10c and the repelling force of the lower yoke 10d. During the operation, the directions of the currents applied to the coils 14a, 14b of the upper drive unit 100 are kept unchanged.

By an analogous operation, position of the lens unit 11 of the upper drive unit 100 can be changed from its front focal point of FIG. 5 to its rear focal point of FIG. 7, while the position of the lens unit 11 of the lower drive unit 200 shown in FIG. 5 is unchanged.

It is to be understood that the two lens units 11 of the two drive units 100, 200 can move synchronously. In this situation, currents are applied to the coils 14a, 14b of the two drive units 100, 200. As the polarities of the two yokes 10c, 10d of each drive unit 100, 200 are different from each other, for each drive unit 100, 200, an attractive force is generated between one of the yoke 10c, 10d and the magnet 12, and a repelling force is generated between the other yoke 10c, 10d and the magnet 12. The magnet 12 of each drive unit 100, 200 thus can have a telescopic movement between its front focal point and rear focal point. Alternatively, the two coils 14a, 14b of each drive unit 100, 200 can be wound along the same direction, and thus the directions of the electric currents applied to the coils 14a, 14b of each drive unit 100, 200 are opposite to each other, to thereby establish two different induced magnetic fields. It can also be understood that when the polarities of the magnet 12 is exchanged, the direction of the electric currents applied to the coils 14a, 14b should be changed accordingly. Thus the lens unit 11 can switch between its rear focal point and front focal point easily. The camera thus has four different focal points. The focusing procedure is easy and convenient, which can save precious power of the camera incorporating the drive units 100, 200. Moreover, this camera with the drive units 100, 200 according to the present invention has a very simple structure and can be easily assembled.

What is claimed is:

1. An auto-focusing camera comprising:
    a plurality of drive units stacked on each other, each drive unit comprising:
        a lens mount;
        a lens unit received in the lens mount;
        a permanent magnet being fixedly mounted around the lens unit to move with the lens unit;
        a first coil seat arranged on a first side of the magnet with a first coil wound thereon and a second coil seat arranged on a second side opposite to the first side of the magnet with a second coil wound thereon, each coil establishing a magnetic field when an electric current is applied to the each coil, the magnetic fields of the first and second coils interacting with the magnetic field of the magnet to drive the lens unit into movement between its front focal point and its rear focal point; and
        first and second yokes each having a plurality of claws extending perpendicularly therefrom;
        wherein each coil seat comprises a cylinder and a flange extending outwardly from a side of the cylinder near the magnet, the cylinder of each coil seat defining a plurality of grooves in an inner circumferential surface thereof receiving the claws of one corresponding yoke therein.

2. The auto-focusing camera as claimed in claim 1, wherein the camera comprises two drive units being arranged back-to-back and connected together.

3. The auto-focusing camera as claimed in claim 2, wherein the lens unit comprises a lens barrel and a lens mounted in the lens barrel, the lens of one drive unit being a concave lens, and the lens of the other drive unit being a convex lens.

4. The auto-focusing camera as claimed in claim 1, wherein a plurality of nubs are formed on an outer surface of the lens barrel, and one of the coil seats defines a plurality of canals receiving the nubs therein, whereby the lens barrel is non-rotatable relative to the coil seats.

5. The auto-focusing camera as claimed in claim 1, wherein the magnet abuts the flange of one coil seat and spaces from the other coil seat when the lens unit is at its focal points.

6. The auto-focusing camera as claimed in claim 1, wherein a plurality of blocks extend from the flange of each coil seat toward the other coil seat, and two guiding pins are formed on the blocks of each coil seat for connecting ends of corresponding coils winding on the each coil seat.

7. The auto-focusing camera as claimed in claim 6, wherein each block of one coil seat overlaps and abuts against a corresponding block of the other coil seat.

8. The auto-focusing camera as claimed in claim 6, wherein one of the coil seats has a base extending outwardly from a side thereof far from the magnet, and a pair of connecting pins are formed on the base and connected to the ends of the coils, the lens mount defining cutouts corresponding to the connecting pins for connecting the coils to a power source.

9. An auto-focusing camera comprising:
    a pair of drive units arranged in series, each drive unit comprising:
        a lens unit;
        a permanent magnet being fixedly mounted around the lens unit to move with the lens unit;

first and second coil seats mounted around the lens unit and arranged at opposite sides of the magnet with first and second coils wound thereon, each coil establishing a magnetic field when an electric current is applied, the magnetic fields of the first and second coils interacting with the magnetic field of the magnet to drive the lens unit into movement between the upper and lower coil seats; and first and second yokes each comprising a plurality of claws extending perpendicularly therefrom;

wherein each coil seat comprises a cylinder and a flange extending outwardly from a side of the cylinder near the magnet, the cylinder of each coil seat defining a plurality of grooves in an inner circumferential surface thereof receiving the claws of one corresponding yoke therein, a plurality of blocks extend from the flange of each coil seat toward the other coil seat, and wherein two guiding pins are formed on the blocks of each coil seat for connecting ends of corresponding coils winding on the each coil seat.

10. The auto-focusing camera as claimed in claim 9, further comprising a lens mount receiving the coil seats therein, the lens mount defining a plurality of cutouts therein, one of the coil seats having a base extending outwardly from another side of the cylinder far away from the magnet, and a plurality of connecting pins formed on a periphery of the base, the connecting pins connected to ends of the coils for connecting the coils to a power source, the connecting pins being received in the cutouts of the lens mount.

11. An auto-focusing camera comprising:
a lower drive unit and an upper drive unit stacked on the lower drive unit, each drive unit comprising:
a lens mount;
a lens unit received in the lens mount;
a permanent magnet being fixedly mounted around the lens unit to move with the lens unit;
a first coil seat arranged on a first side of the magnet with a first coil wound thereon and a second coil seat arranged on a second side opposite to the first side of the magnet with a second coil wound thereon, each coil establishing a magnetic field when an electric current is applied to the each coil, the magnetic fields of the first and second coils interacting with the magnetic field of the magnet to drive the lens unit into movement between its front focal point and its rear focal point; and first and second yokes each having a plurality of claws extending perpendicularly therefrom;

wherein each coil seat comprises a cylinder and a flange extending outwardly from a side of the cylinder near the magnet, the cylinder of each coil seat defining a plurality of grooves in an inner circumferential surface thereof receiving the claws of one corresponding yoke therein; and wherein the lens unit of the upper drive unit has one of a concave lens and a convex lens, and the lens unit of the lower drive unit has the other of the concave lens and the convex lens.

12. The auto-focusing camera as claimed in claim 11, wherein a plurality of blocks extend from the flange of each coil seat toward the other coil seat, and two guiding pins are formed on the blocks of each coil seat for connecting ends of corresponding coils winding on the each coil seat.

13. The auto-focusing camera as claimed in claim 12, wherein each block of one coil seat overlaps and abuts against a corresponding block of the other coil seat, the blocks which are located adjacent to the lens unit being tangential to the lens unit.

14. The auto-focusing camera as claimed in claim 12, wherein the grooves of each coil seat extend along a direction parallel to a central axis of the cylinder, and are evenly spaced from each other along a circumferential direction of the cylinder.

* * * * *